United States Patent [19]

Goldstein

[11] 4,262,861

[45] Apr. 21, 1981

[54] INERTIALLY DECOUPLED STRAPDOWN SYSTEM

[75] Inventor: Murray S. Goldstein, Spring Valley, N.Y.

[73] Assignee: The Singer Company, Little Falls, N.J.

[21] Appl. No.: 952,016

[22] Filed: Oct. 16, 1978

[51] Int. Cl.³ .................... F41G 7/00; F42B 15/02; G06F 15/50
[52] U.S. Cl. ........................................ 244/3.2; 364/453
[58] Field of Search ................. 244/3.2, 175; 102/DIG. 3; 364/453

[56] References Cited

U.S. PATENT DOCUMENTS

| | | | |
|---|---|---|---|
| 3,312,423 | 4/1967 | Welch | 244/3.2 |
| 3,414,899 | 12/1968 | Buell | 364/453 |
| 3,746,281 | 7/1973 | Stripling | 244/3.2 |
| 3,924,824 | 12/1975 | Brodie et al. | 244/3.2 |

*Primary Examiner*—Theodore M. Blum

*Attorney, Agent, or Firm*—Laurence A. Wright; Thomas W. Kennedy

[57] ABSTRACT

The invention comprises a novel strapdown gyro inertial system having a single degree of freedom between it and the vehicle upon which it is mounted. An angular transducer having a low friction bearing is mounted on the vehicle along the vehicle roll axis bearing and supports the strapdown gyros and accelerometers that are skewed with respect to the roll axis. The method of determining the total vehicle attitude employs the gyros so that the vehicle rate around each gyro axis is integrated and combined with the vehicle angular roll to obtain the total attitude. The inertial momentum of the sensor block, electrically enhanced or strictly dependent upon its mass, decouples high acceleration inputs along the free axis and thus reduces the dynamic rate sensing requirement along the free axis. Also the novel configuration of the sensors skewed with respect to the free axis, permits easy calibration of gyro scale factors and other inertial parameters which are characteristics of gyroscopes and accelerometers. The calibration is attainable in the factory or in the field.

10 Claims, 2 Drawing Figures

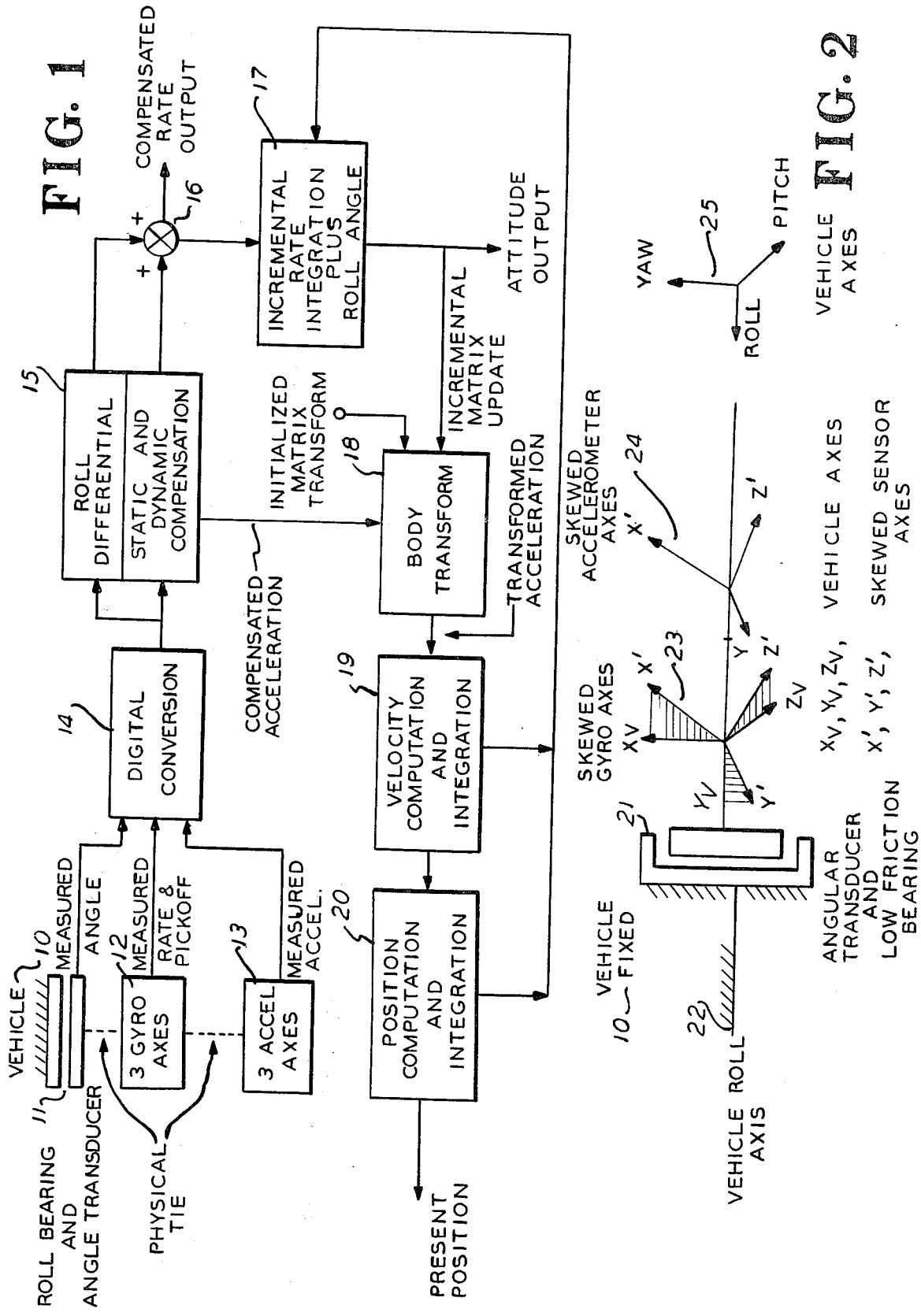

FIG. 2 is a diagrammatic configuration of the present invention showing the sensors skewed along the vehicle roll axis.

Referring now to FIG. 1, the strapdown inertial gyro system of the invention comprises a vehicle 10 shown here fragmatically but which may be part of an aircraft or missile. Mounted to have a single degree of freedom along the roll axis of the vehicle 10 is roll bearing and angle transducer 11. The roll bearing and angle transducer is designed to be a low friction bearing. Physically connected to angle transducer 11 are three strap down gyros shown in block 12 and three accelerometers shown in block 13. The axes of the gyros of block 12 and the accelerometers of block 13 can be oriented orthogonally to each other as is conventional. However, in the present invention all of the axes of the gyros and accelerometers are skewed in relation to the roll axis of vehicle 10. The digital converter block 14 converts the analog signal from the angle transducer 11, gyros 12, and accelerometers 13 to digital signals for further processing through the system. In the case of the signal from angle transducer 11 it represents the measured angle of rotation of the transducer about the roll axis of the vehicle. The signals from block 12 represent the measured gyro rate and pickoff, and the signals from block 13 represent the measured acceleration. The outputs from converter 14 are applied to differentiator compensator block 15. The outputs from block 15 are applied to summing network 16 from which compensated rate output is obtained. Block 15 also provides a compensated acceleration signal to body transform block 18 which also receives initialized matrix transform signals and an incremental matrix update signal from block 17. The output signal from block 18 represents a transformed acceleration signal which is applied to velocity and integration circuits block 19 to provide a velocity signal output. The output of block 19 is applied to block 20 for a second integration to provide a present position output signal. The output from blocks 19 and 20 are fed back to block 17 which provides a position update signal.

It is seen from FIG. 1 that the roll output from block 15 is a combination of the rate output integrated in block 15 and appropriately compensated and the attitude output of the roll attitude 11. One can liken this to a loosely captured gyro where the pickoff and integrated torque output from block 12 are combined appropriately to provide attitude. Only now we enhance the gyro pickoff output with a body attitude sensor providing decoupling along the roll axis.

Thus, the matrix update cycle and the compensations associated with a dynamic gyro rate output signals of blocks 15 and 17 requires less thru-put speed. This is especially true in the integration and transformation matrices of blocks 15 and 17. The conversion block 14 simply produces the useable input to the computer in the form of angular rate, acceleration and angular pulses. The desire to have roll attitude rate requires that the angular attitude be differentiated in block 15 which is a minor inconvenience for those systems requiring only navigation and attitude outputs. Thus, the momentum vector's relationship to the vehicle attitude is a composite of transducer output, gyro pickoff and gyro are integrated.

The configuration of FIG. 1 accomplishes the following:

(a) Eliminates platform gimbal servos,
(b) Reduces high rate inputs to the gyro/accelerometer cluster,
(c) Eliminates slip rings,
(d) Permits calibration,
(e) Improves reliability, and
(f) Improves checkout and maintenance procedures.

This is accomplished through the fact that the gyro/accelerometer package has inertial momentum and inertial reaction to prevent immediate sensing of the roll input rate (maximum input rate of vehicle) and hence senses less rate. The rotation is measured by the attitude transducer block 10 which may be a resolver or inductosyn readout or any other comparable transducer.

The other methods of performing the function of the invention is the use of:

(a) Strapdown system—all gyros and accelerometers are physically tied to the vehicle. (Long term stability and calibration problems).
(b) Platform—gyros and accelerometers are servo driven to null through gimbals, slip rings, and servo electronics and torquers. (maintenance and cost disadvantages).
(c) One or two gimbal systems—gyros and accelerometers servo driven through one or two gimbals with electronics slip rings and torquers. (A combination of (a) and (b)).

All the above (a) through (c) have a number of disadvantages attendant to their use.

Referring to FIG. 2 there is shown a functional block diagram in which reference numeral 21 shows an angular transducer having a low frictional bearing attachment to the vehicle (not shown). Angular transducer 21 is free to rotate about roll axis 22. Strapdown gyros 23 and accelerometers 24 are permanently attached to angular transducer 20. The gyros and accelerometers axes are skewed a predetermined amount from roll axis 21. The three axes of the vehicle are shown at 25.

The configuration of the equipment of the invention performs navigation and guidance by determining present position through the use of accelerometers 24 and gyros 23 mounted skewedly which mounting permits advantages of a pure strapdown system, but which eliminates the disadvantages thereof. The use of a free bearing/resolver combination onto which is mounted the gyro/accelerometer package reduces transient high roll rates from being sensed by the gyro/accelerometer package. The gyro/accelerometer package is not servo driven to the output of the resolver. The attitude output is in simple terms:

$$\text{Roll} \sphericalangle X = \theta_R + \int G_R dt$$

$$\text{Pitch} \sphericalangle X = \int G_P dt$$

$$\text{Azimuth} \sphericalangle X = \int G_{AZ} dt$$

where $G_R$, $G_P$, $G_{AZ}$ are transformed combinations of integrated gyro rate outputs within an appropriate coordinate system.

The strapdown inertial gyro system of the present invention offers the following significant advantages:

1. Reduces the dynamic measuring range of the gyro to a more manageable extreme.
2. The configuration of the present invention permits ease of calibration.
3. Dependent upon the vehicle the system does not require any servo assist to maintain gimbal orientation.

INERTIALLY DECOUPLED STRAPDOWN SYSTEM

This invention relates to strapdown gyro inertial systems. More particularly, this invention relates to a strapdown gyro inertial system having a degree of freedom between the sensors and the vehicle.

BACKGROUND OF THE INVENTION

Inertial navigation systems are based upon the stabilization of a coordinate frame defined by gyroscopes and the measurement and processing of accelerometer information in that frame to achieve velocity and position knowledge of the vehicle. The strapped down mode of achieving the reference measurement frame described herein uses gyroscopes "strapped" to the vehicle but containing one degree of freedom. The rate measurements are appropriately integrated and compensated and computationally added to the angle output to derive the stabilized attitude of the reference frame. To permit highly accurate attitude measurements with vehicle rates of 0.01°/Hr thru 500°/sec a dynamic performance over the range $2 \times 10^8:1$ is required. One purpose of this invention is to reduce the dynamic range requirement significantly and secondly to make use of this approach to permit a unique method of calibrating the gyro scale factor, symmetry, and other terms which are critical parameters in strapdown system performance. The requirements upon the gyroscope to have accurate measurement capability from one day to the next for months or even years while still capable of operating over the dynamic range is severe. It would be advantageous to be able to move the gyro in an accurate manner relative to a known rate (usually earth's rate) so as to calibrate the gyro. This calibration could be accomplished via the degree of freedom, periodically relieving the gyro of the requirement to maintain stability over long periods of time. Additionally with the gyroscope appropriately skewed relative to a degree of freedom, the gyro scale factors can be easily calibrated either in the factory or in the field by causing a rotation around this free axis, enunciating the output via an angular transducer and comparing this to the integrated gyro output.

As stated previously, a significant problem that strapped down systems impose upon the inertial sensors is the requirements for long term stability as well as accurate scale factors over a wide measurement range. Generally, gyroscopes and accelerometers tend to have excellent short term stabilities measured over a period of time the unit is operating, usually up to 10 hours. This is better by a factor of 5 or 10 to 1 than long term stability. Long term stability is measured over periods of weeks and months with many turn-ons and turn-offs between. Gyroscopes and accelerometers used in strapdown systems very often cannot meet accuracies commensurate with a 1 NMPH navigation system. In order to reduce the requirement upon the component, calibration procedures are utilized to periodically calibrate the inertial parameters by rotating each component against the earth rate rotation or "g" vector. With strapped down system, the rotation is impossible unless a degree of freedom is allowed.

Making use of the rotational freedom suggested herein in the roll direction, permits the parameters such as gyro biases, scale factor and symmetries, and acceleration biases to be calibratable. The gyro and acceleration axes are mounted so that none will directly lie along the roll axis of freedom. Thus, when the rotational freedom permits a rotation all axes will sense a component of the rotation permitting gyro scale factor calibration. Also this same rotation can be referenced against the vertical component of the earth's rate and the "g" vector to obtain bias updates for both the gyro and accelerometers.

It must be remembered that scale factor is a very dominant term requiring extreme accuracy (50 ppm and better) and the ability to have a simple rotation measured by an angular transducer is extremely beneficial. The total angle is accurately measured by the transducer and compared to the integrated output of the gyro. The comparison yields the information for calibration.

The essence of the invention is to combine the ability to calibrate scale factor and other inertial parameters (by permitting a degree of freedom and sensor skewing relative to the axis of freedom) and to permit this same degree of freedom to exist along the most dynamic axis of an aircraft, usually roll, so the full dynamic range requirement on the sensors do not exist.

A specific characteristic of most aircraft whose aerodynamic performance permits vehicle rates in the order of 200 to 500 degrees per second is that the high rate occurs along one axis only; the roll axis. Further, this rate is transient in nature. It occurs quickly with high angular acceleration and lasts for approximately a second or less. The invention makes use of this characteristic, and suggests the mechanical configuration which permits roll mechanical freedom. With roll mechanical freedom two significant benefits arise. The first is the reduction in dynamic range by at least a half order of magnitude, and the second, the mechanical freedom which permits calibration sequences since rotation is now permissible against a known rate and "g" vector.

BRIEF DESCRIPTION OF THE INVENTION

The strapdown gyro inertial system of the present invention is mounted on a vehicle and comprises a moveable angular transducer having a low friction bearing mounted on the vehicle along the free roll axis. This angular transducer supports strapped down gyros and accelerometers angularly skewed with respect to the roll axis. The method of determining the total vehicle attitude employs the gyroscopes so that the vehicle rate around each gyro axis is integrated and combined with the vehicle angular roll to obtain the total attitude.

The angular freedom reduces the total angular rate which the gyros must sense, and thus reduces the total angular rate range which the gyros must accurately sense. Also it permits the gyros and accelerometer to be rotated at the user initiation to permit calibration of key component parameters. The angular transducer is located on this free axis to permit angular readout to provide a reference for calibration.

Accordingly, it is an object of this invention to provide a strapdown inertial gyro system having a single axis of freedom which permits a reduction in dynamic range and provides a reference for calibration.

This and other objects, features and advantages of the present invention will become apparent from the following description taken in conjunction with the accompanying drawings wherein:

FIG. 1 is a functional flow block diagram of the strapdown gyro system of the present invention; and 4. The full advantages of a strapdown system is still obtainable.

5. Maintenance capability is even further enhanced over that of a fully strapped-down system because of the checkout procedure capability offered by the free gimbal.

While particular embodiments of the invention have been shown and described, modifications may be made, and it is intended in the following claims to cover the embodiments which fall within the true spirit and scope of the invention.

What is claimed is:

1. A strapdown gyro inertial system comprising:
   means for transporting said strapdown inertial system,
   means affixed to said transporting means and mounted along the roll axis thereof,
   means having angular rotation along said roll axis mounted to said fixed means, and
   gyro means skewedly mounted with respect to said roll axis on said means having angular rotation whereby said means having angular rotation provides angular readout to add to gyro output and provides a reference for calibration of said strapdown gyro inertial system.

2. The strapdown gyro inertial system of claim 1 wherein said means having angular rotation along said roll axis comprises:
   an angular transducer having low friction bearing said angular transducer reducing the total angular rate which said gyro means must sense and reducing the total angular rate range which said gyro means must accurately sense.

3. The strapdown gyro inertial system of claim 2 wherein said gyro means comprises:
   strapdown gyros and accelerometers skewedly mounted on said angular transducer with respect to said roll axis so that each axis of said gyros sensor can sense rotation about said roll axis and so that said skewing further reduces the total roll angular rate sensed by the gyros whereby the dynamic measuring range of said strapdown gyro inertial is further reduced.

4. A strapdown gyro inertial system comprising:
   a vehicle supporting said gyro inertial system,
   an angular transducer mounted on said vehicle and having angular rotation along the roll axis of said vehicle, and
   strapdown gyros and accelerometers skewedly mounted on said angular transducer with respect to said roll axis so that each axis of said gyro sensor can sense rotation about said roll axis and so that said skewing further reduces the total roll angular rate sensed by said gyros whereby the dynamic measuring range of said strapdown gyro system is further reduced.

5. The strapdown gyro inertial system of claim 4 comprising:
   means for converting the measured roll angle signal from said angle transducer and the rate signals from said gyros and accelerometers into digital signals.

6. A strapdown gyro inertial system comprising:
   a vehicle supporting said gyro inertial system,
   an angular transducer mounted on said vehicle and having angular rotation along the roll axis of said vehicle,
   strapdown gyros and accelerometers skewedly mounted on said angular transducer with respect to the roll axis of said vehicle so that each axis of said gyro sensors can sense rotation about the roll axis and so that said skewing further reduces the total roll angular rate sensed by said gyros, whereby the dynamic measuring range of said strapdown gyro system is further reduced,
   means for converting the measured roll angle signal from said angle transducer and the rate signals from said gyros and accelerometers into digital signals, and
   means for providing a compensated roll output that is combined with the integrated rate output of said gyros so that said roll output is decoupled along said roll axis.

7. The strapdown gyro inertial system of claim 6 comprising:
   means for transforming the compensated acceleration signals from body coordinate to inertial coordinate signals.

8. The strapdown gyro inertial system of claim 7 comprising:
   means operative on said inertial coordinate signals for providing system velocity signals.

9. The strapdown gyro inertial system of claim 8 comprising:
   means operative on said velocity signals for providing system position output signals.

10. A strapdown gyro inertial system comprising:
    a vehicle supporting said gyro inertial system,
    an angular transducer mounted to said vehicle having angular rotation along the roll axis of said vehicle,
    a plurality of strapdown gyros each oriented along three approximately orthogonal axes skewedly mounted on said angular transducer with respect to said roll axis,
    a plurality of accelerometers each oriented along the three orthogonal axes of said gyros also skewedly mounted on said angular transducer with respect to said roll axis,
    a digital converter for converting the measured roll angle signal from said angle transducer and the rate signals from said gyros and accelerometers into digital signals,
    a differentiator and compensation network for providing a compensated roll output signal that is combined with the rate and integrated rate output of said gyros,
    a body transform matrix for transforming the compensated signals from body coordinates to inertial coordinate signals,
    a first computation and integration network for converting said inertial coordinate signals into system velocity,
    a second computation and integration network operative upon the output of said first computation and integration network for providing system position, whereby the pg,19 single degree of freedom provided by said angle transducer and said skewing further reduces the total roll angular rate sensed by the roll gyro resulting in the dynamic measuring range of said strapdown gyro inertial system being reduced.

* * * * *